Sept. 13, 1960      W. B. JACKSON      2,952,722
RECIPROCATING ZONE PURIFICATION Filed Dec. 5, 1957      3 Sheets-Sheet 1

INVENTOR.
WALTER B. JACKSON
BY Wade Koontz and
Arnold H. Cole
ATTORNEYS

Sept. 13, 1960  W. B. JACKSON  2,952,722
RECIPROCATING ZONE PURIFICATION
Filed Dec. 5, 1957  3 Sheets-Sheet 2

INVENTOR.
WALTER B. JACKSON
BY
Wade Koontz
Arnold H. Cole
ATTORNEYS

United States Patent Office 2,952,722
Patented Sept. 13, 1960

2,952,722
RECIPROCATING ZONE PURIFICATION

Walter Burton Jackson, Waltham, Mass., assignor to the United States of America as represented by the Secretary of the Air Force Filed Dec. 5, 1957, Ser. No. 700,924

4 Claims. (Cl. 13—20)

(Granted under Title 35, U.S. Code (1952), sec. 266)

The invention described herein may be manufactured and used by or for the United States Government for governmental purposes without payment to me of any royalty thereon.

This invention relates to zone purification, and is more particularly concerned with a reciprocating apparatus for such purification.

The basic principles of zone purification are well known. In the process, a length of the metal to be purified is heated beyond its melting point over one portion thereof. The heating is then carried on further along the length of said member as the first portion cools. At all times during the process a liquid-solid interface is maintained. Impurities in the metal favor the liquid phase, and as the cooling of the molten portion proceeds, such impurities are gradually moved along said member until its end is reached. The end, being the final portion cooled, collects all said impurities and is subsequently removed from the purified remainder of said member.

In the apparatus presently in use, either the heating device or the metal to be purified is movable. The other of the two is stationary, and the movable member travels the length thereof. If a second or repurification is desired, it is necessary to reorient the members and begin the entire procedure anew.

The primary object of my invention is to provide a device which permits continuous zone purification of a metal.

More specifically, it is an object of this invention to provide apparatus which, without manual assistance, will zone purify a metal member for as many cycles as may be desired.

Another object of the invention is to provide such an apparatus which is both simple and inexpensive to construct or repair.

Still another object of the invention is to provide a zone purification apparatus which is extremely accurate and efficient, yet requires a minimum of supervision.

The above and still further objects, advantages and features of the invention will become apparent upon consideration of the following detailed description of an embodiment thereof, especially when taken in conjunction with the accompanying drawings, wherein.

Turning specifically to the drawings in which like characters of reference indicate like parts, the zone purifier is generally shown at 10. The purifier 10 comprises a pair of annular end plates 12 and 14. These plates are maintained in spaced relation by a plurality of circumferentially positioned supports 16. The plates may be secured to said supports in any desired manner, angle brackets 18 being used in the illustrated embodiment. Both the supports and the end plates should be formed from non-conducting material for reasons which will become apparent. Suitable materials for this purpose include Transite, Bakelite and Lucite.

Figure 1:
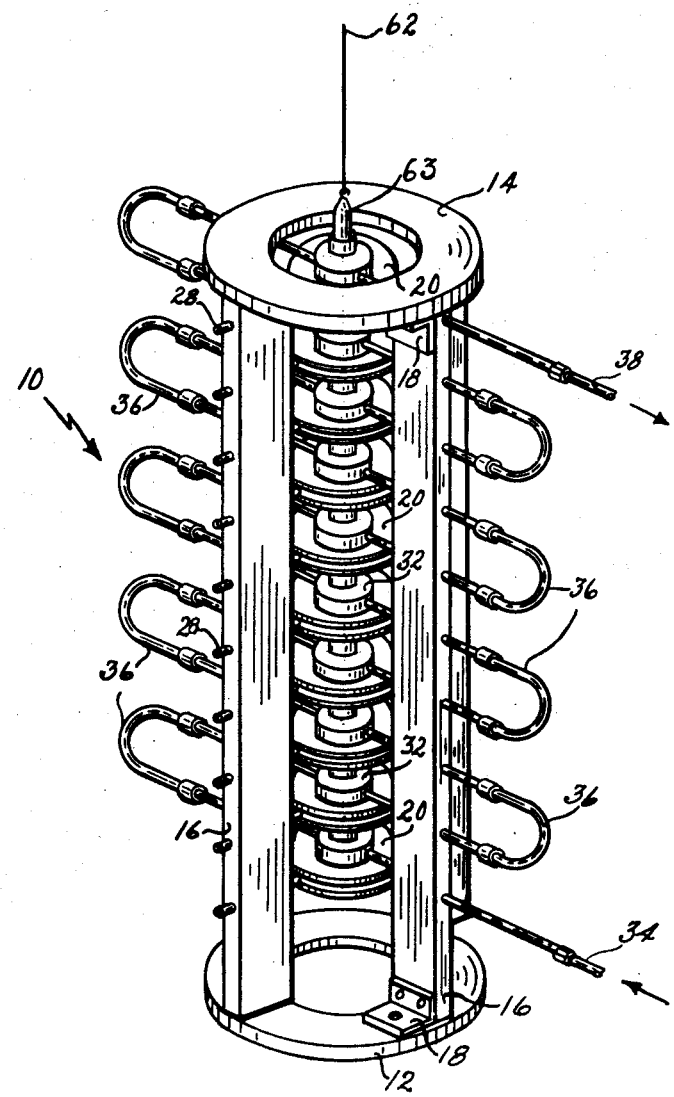
Figure 1 is an elevation showing the zone purifier of my invention.
Figure 3:
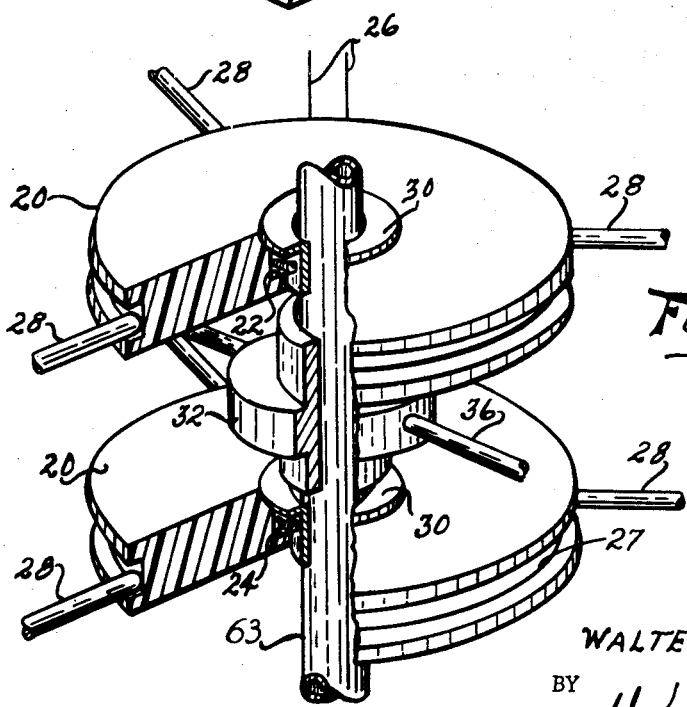
Figure 3 is an enlarged view, partially in section, of two adjacent heating elements of the zone purifier.

A series of heating elements 20, ten being shown in Figure 1, are positioned between the end plates 12 and 14, and within the supports 16. These elements are annular in shape, and the details thereof may be best seen in Figure 3. The inner periphery of each element 20 has a groove 22 running therearound. Positioned within the groove is a helix of wire 24. The elements 20 are formed of Transite, and the wire is Nichrome. A pair of holes (not shown) pass radially through each heating element, and the ends 26 of the wire are received in such holes for connection to a source of current. A groove 27 is formed around the outer edge of each element. These latter grooves receive set screws 28 to hold said elements in place. The set screws pass through the supports 16 and are adjustable externally thereof. A brass bushing 30 is placed within each element 20 and serves to retain the wire in the groove 22. Brass jackets 32 are positioned intermediate each pair of heating elements. Such jackets abut bushings 30 at their ends, and thus the heating elements are held in spaced relationship along their central axis. The jackets 32 also perform a cooling function in the apparatus. An inlet 34, for liquid coolant is located at one end of the purifier 10. The coolant passes through a pipe 36 and is conducted thereby through each of the jackets 32. An outlet 38 is provided adjacent the opposite end of said purifier. The pipe 36 is supported at numerous points along its length by the supports 16.

Associated with the zone purifier is a continuous, automatic reciprocator 40. A housing 42 set upon a base 44 encloses the operating components of the reciprocator. A motor (not shown) within a casing 46 drives a chain and sprocket train 48. The final element in said train is a shaft 50 which rotates a cam 52. Rotation of said cam is clockwise, and it is shaped to provide a slow, uniform rise followed by an abrupt drop off at 53. The cam action is transmitted by means of a follower arm 54. This arm is held against the surface of said cam by means of a counter-balance weight 56 suspended on one end of a chain 58. This chain passes over a series of gears, and its other end is attached to a pin 60 on the follower arm 54. A belt or cable 62 is fixed to the follower and transmits the latter's motion to an ampoule 63 of the material to be purified. Any suitable arrangement of ball bearing pulleys may be used to guide the belt 62.

The heating elements 20 must be positioned so that they are equidistant on centers. This can be accomplished by careful selection of the brass bushings and jackets. In the preferred embodiment such elements are spaced two inches apart. The rise on the cam must be identical with such spacing, and therefore the cam shown has a rise of two inches over the full 360°. The gear train 48 controls the speed of said cam which, in this embodiment is slowed down to one revolution per hour.

Figure 2:
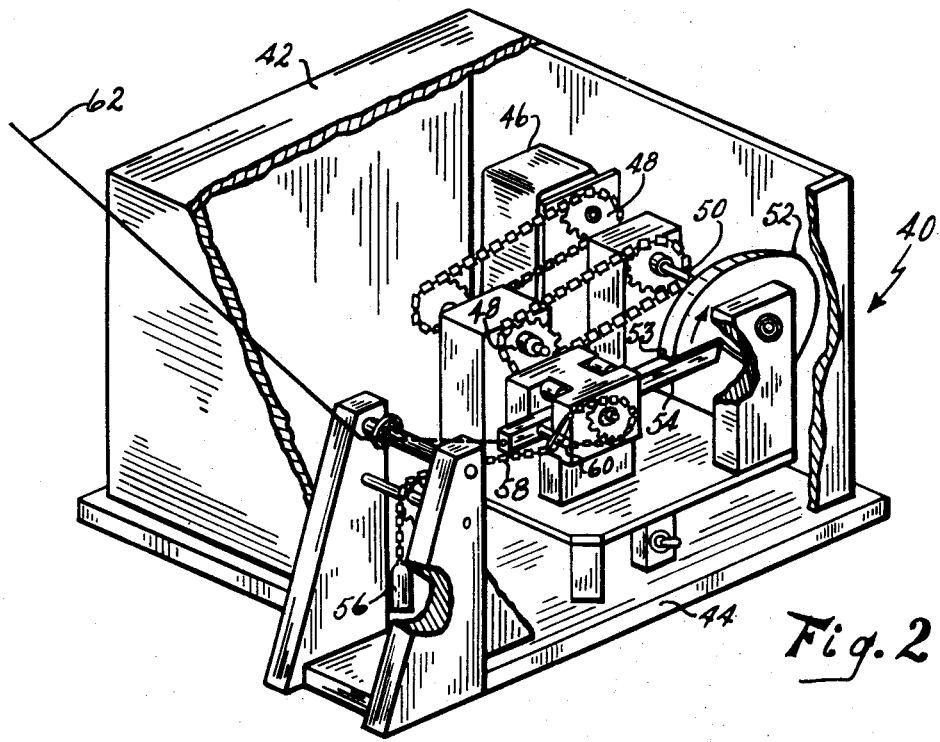
Figure 2 is an elevation showing the reciprocator of the invention, portions of the housing being broken away.
Figure 4:
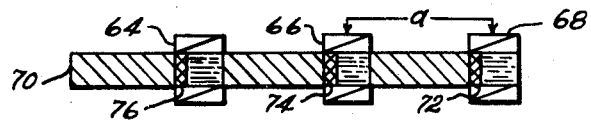
Figures 4 through 14 are a series of schematic views which graphically illustrate the cycle of operation.

To best illustrate the manner of operation, the steps of a purification are graphically shown in Figures 4 through 14. The purifier, for the sake of simplicity, has only three heaters 64, 66 and 68. An ampoule 70 of the substance to be purified passes through said heaters and is operated by a reciprocator as shown in Figure 2. The cam used must have its rise equal to the distance between the centers of adjacent heating elements. In Figure 4, the follower is at the lowest point on the cam, and the ampoule will be moved toward the right as said follower rises.

Figure 5:
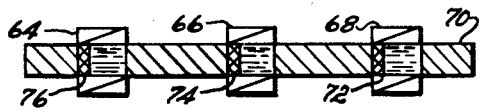
Figure 6:
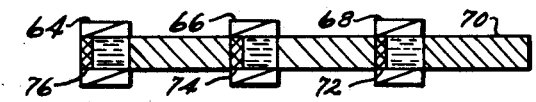
Figure 7:
Figure 8:
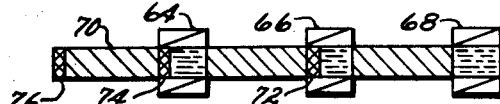
Figure 9:
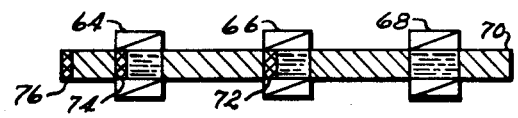
Figure 10:
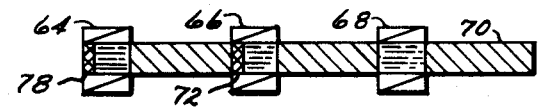
Figure 11:
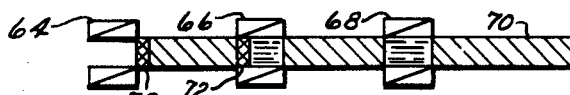
Figure 12:
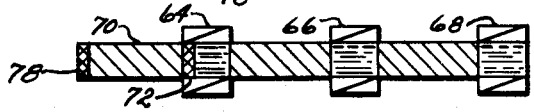
Figure 13:
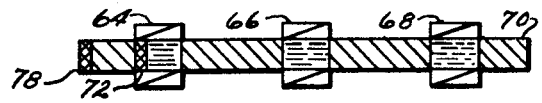
Figure 14:
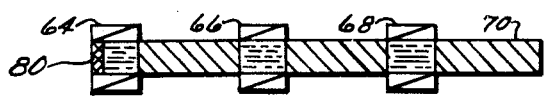

As current is supplied to the three heating elements, the substance to be purified melts in the areas adjacent said elements. The impurities in these areas seek the liquid-solid interface, whereby three zones of impurities result at 72, 74 and 76. In Figure 5 the ampoule has covered one-third of its path, and as the solid areas move through the heating elements, the zones 72, 74 and 76 remain at the interfaces. Thus, such zones are moved towards the left-hand end of the ampoule. Figures 6 and 7 show the ampoule at the two-thirds and end positions of its path. The impurity zones have each moved towards the left and a large area of purified material now exists at the opposite end. As the follower drops off the high point 53, the ampoule returns to its initial position within the heaters, as seen in Figure 8. The process again proceeds in the same fashion until, as shown in Figure 10, movement of the ampoule results in the merger of the zones 74 and 76 to form a single zone 78. When the ampoule 70 again returns to its starting position, Figure 12, there are only two zones of impurities, 72 and 78, while the purified area at the opposite end has enlarged still further. The cam follower repeats its action causing said ampoule to move through the heaters, and when the position of Figure 14 is reached, all of the impurities are consolidated in a single zone 80. The reciprocator may then be shut off, and the heating elements are allowed to cool. The ampoule is now removed, and the zone 80 cut off leaving only the purified material. Obviously as the number of heaters is increased, it is necessary to permit a similar increase in the number of full revolutions of the cam 52. If greater degrees of purity are required, the entire process is repeated as many times as are necessary. However, no resetting or rearranging is ever needed. The ampoule will continue to reciprocate over a path equal to the distance between adjacent heater centers until the motor is shut off.

From all of the foregoing it is clear that a greatly improved and simplified process for zone purification has been developed. It is to be understood that the above-described embodiment is merely illustrative of the applications of the principles of my invention. Numerous other arrangements may be devised by those skilled in the art without departing from the spirit and scope of the invention.

What is claimed is:

1. A reciprocating zone purifier comprising an elongated vessel carrying a substance to be purified, a series of heating elements equally spaced along said vessel, each of said heating elements comprising a helix of Nichrome wire held in an annulus of non-conducting material, a reciprocating drive means for said vessel, said means being arranged to drive said vessel a distance equal to the space between adjacent elements and then abruptly return said vessel to its starting position, said drive means including a cam having a rise equal to the space between adjacent heating elements, a drop off on said cam at the end of said rise, and a follower in contact with said cam, said follower having a motion transmitting connection to said vessel.

2. A reciprocating zone purifier comprising an elongated vessel carrying a substance to be purified, a series of heating elements equally spaced along said vessel, each of said heating elements comprising a helix of Nichrome wire held in an annulus of non-conducting material, cooling means positioned between each pair of adjacent heating elements, a reciprocating drive means for said vessel, said means being arranged to drive said vessel a distance equal to the space between adjacent elements and then abruptly return said vessel to its starting position, said drive means including a cam having a rise equal to the space between adjacent heating elements, a drop off on said cam at the end of said rise, and a follower in contact with said cam, said follower having a motion transmitting connection to said vessel.

3. A device for zone purification comprising a plurality of annular heaters, said heaters comprising a casing of non-conducting material holding a helix of Nichrome wire, said wire being positioned in a groove on the inner circumference of said casing, a vessel positioned centrally within said heaters and containing a substance to be purified, the distance between adjacent heaters along said vessel being equal, motor means driving a cam, said cam having a gradual rise equal to said distance, and a drop off at the high point of said rise back to the low point thereof, follower means associated with said cam and attached to said vessel whereby the latter is reciprocated within said heaters, and a plurality of liquid cooled jackets surrounding said vessel, each jacket being positioned between a pair of adjacent heaters.

4. A device as defined in claim 3 and further including a plurality of supporting members arranged around said heaters, and set screws passing through said members and engaging an outer circumferential groove in each heater for maintaining said heaters in spaced relation.

References Cited in the file of this patent

UNITED STATES PATENTS

| | | |
|---|---|---|
| 1,281,673 | Seeley | Oct. 15, 1918 |
| 2,280,770 | Anderson | Apr. 21, 1942 |
| 2,491,210 | Rennee | Dec. 13, 1949 |
| 2,719,799 | Christian | Oct. 4, 1955 |
| 2,743,199 | Hull et al. | Apr. 24, 1956 |
| 2,765,361 | Capita | Oct. 2, 1956 |
| 2,773,923 | Smith | Dec. 11, 1956 |
| 2,782,287 | Smith | Feb. 19, 1957 |
| 2,801,192 | Overby | July 30, 1957 |
| 2,835,612 | Taylor | May 20, 1958 |

OTHER REFERENCES

Schumacher: 1428, Journal of Metals, November 1953 (Ultra-Pure Metals Produced by Zone-Melting Technique).

Pfann: 2000, Bell Telephone System, October 1952 (Principles of Zone Melting).

Recorder, 166, Metal Industry, August 29, 1952 (Zone Melting).

Tanenbaum et al.: (Monograph) 762, Journal of Metals, June 1954 (Purification of Antimony and Tin by a New Method of Zone Refining).

Detwiler et al.: 205, Journal of Metals, January 1955 (Purification of Gallium by Zone-Refining).